3,488,422
CONTROL AND PREVENTION OF BLACKHEAD DISEASE IN BIRDS
Milan Mitrovic, Nutley, N.J., assignor to Hoffmann-La Roche Inc., Nutley, N.J., a corporation of New Jersey
No Drawing. Filed May 29, 1967, Ser. No. 642,176
Int. Cl. A61k 27/00, 21/00
U.S. Cl. 424—258                    4 Claims

ABSTRACT OF THE DISCLOSURE

Novel 2,3-dehydroemetine compositions useful for the control and prevention of blackhead disease in birds.

SUMMARY OF THE INVENTION

This invention relates to veterinary compositions and to their use in the control and prevention of blackhead disease in birds. More specifically, this invention relates to the method of treatment of birds, particularly poultry, with 2,3-dehydroemetine dihydrochloride for preventing and controlling blackhead disease.

BACKGROUND OF THE INVENTION

Blackhead disease, invariably fatal, occurs in birds of all ages. Its economic impact in terms of losses is greatest in turkeys, which are particularly susceptible to the disease. Other poultry and birds, e.g., chickens, guineas, quails, pheasants and pea-fowl, also frequently contract the disease which is caused by a flagellate protozoan identified as Histomonas meleagridis. Its clinical symptons are manifested by lesions and inflammation of the ceca and liver. Because of its etiology and gross pathology, the disease is known as *histomoniasis* and/or *infectious enterohepatitis*.

Histomonas meleagridis is mostly harbored by the common poultry cecal worms, Heterakis gallinae, and its eggs, in which it is able to live for extended periods. This source is mainly responsible for the transmission of the disease.

The disease is contracted orally by the birds when consuming feed or water contaminated with droppings containing the infectious organism or by swallowing cecal worms or their eggs harboring the parasite. The incubation period of blackhead is about 14 to 21 days. The disease manifests itself in the infected birds by inappetence, a constant yellowish or sulfur colored diarrhea and weight loss followed by death. Generally, young birds are more susceptible than adults, although the mortality rate in both groups is very high. Adult birds are usually sick for several days losing much weight before they die while the young birds succumb much quicker.

Post-mortem examinations of the birds disclose multiple lesions and ulcerations of the cecal wall and liver. The ceca are filled with yellowish-green cores and the cecal walls are thickened. The lesions of the liver consist of large irregular reddened or gray necrotic areas.

In turkeys particularly, the prognosis of the disease is poor. The high mortality rate, at times 100% of the flock, results in large losses to the poultry breeder. Losses are in excess of $4 million annually. Heaviest losses are during the first three months of life, however, other age groups are also affected. The disease is prevalent in all areas where turkeys are raised.

The prevent and control of blackhead disease is at present effected by various chemotherapeutic treatments which are either inadequate or uneconomical because of high dosages of expensive drugs or substantial weight gain retardation of the birds caused by the histomonostats.

It is therefore an object of this invention to provide histomonostat compositions containing 2,3-dehydroemetine for the prevention and cure of blackhead disease and possessing a high degree of efficacy with negligble side effects at low dosages.

DETAILED DESCRIPTION OF THE INVENTION

The objects of this invention are accomplished when birds, particularly turkeys, though the invention is not limited thereto, are treated with compositions containing from about 0.0015% to 0.0125% by weight of the active compounds. Generally from 0.0015 gram to 0.0125 gram per hundred grams of feed or water or other inert carrier of the dehydroemetine compounds, hereinafter defined, is used in treating the birds. Generally when the inert carrier is dry feed, from 0.003 gram to 0.0250 gram of active compound per hundred grams of feed is used and when the inert carrier is water, from 0.0015 gram to 0.0125 gram of active compound per 100 cc. of water is used. This treatment results in substantially complete control of the disease. The particular dosage depends upon the specific compound used and the method of administration. While it is possible to treat the birds orally, parenterally or topically, the preferred method is by oral administration, e.g., in the feed, in the drinking water, or in other ingestable inert carriers. Generally, a bird will take in, on a weight basis, about twice as much water as dry feed. Thus, the dosage of histomonostat in the water is about half that in the feed. The preferred preventive dosage in feed is about 0.0125 gram per 100 grams of feed. In drinking water the preferred preventive dosage is about 0.00625 gram per 100 cc. of water. For therapy, usualy twice the preventive dosage is used.

The compound useful in the composition of this invention for the treatment and prevention of blackhead disease, particularly in turkeys, is 2,3-dehydroemetine represented by the following formula:

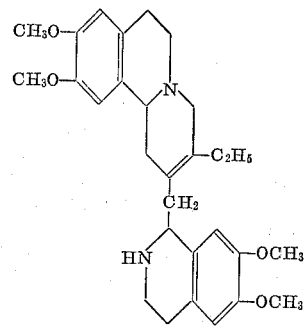

and pharmaceutically acceptable salts thereof. As used herein, the expression "pharmaceutically acceptable salts" means salts with pharmaceutically acceptable acids, e.g., sulphuric, hydrochloric, nitric, phosphoric, acetic, maleic, salicylic, etc. The preferred salt is the dihydrochloride.

The compositions are administered orally to the birds in the preferred embodiment of this invention. The compositions can be formulated by incorporating the compounds into conventional pharmaceutical carrier materials, either organic or inorganic, which are suitable for oral application and can be fomulated with other noninterfering therapeutically useful materials. The preferred mode of administration of the drug is simple admixture with the feed or drinking water.

The compounds useful in forming the compositions of this invention are prepared according to methods described in U.S. Patent 3,240,782.

EXAMPLE 80 g. of rac. 2-dehydro-isoemetine was dissolved in 3.2 liters of 10% aqueous acetic acid, mixed with 250 g. of mercuric acetate, and the resulting mixture maintained at 40° C. for 15 hours. The resultant mercurous acetate was filtered off, the excess mercuric salt removed as sulfide, and the filtered solution concentrated at 40° C. (bath temperature) in vacuo. The residual product was converted to its hydrochloride with methanolic hydrochloric acid and this was crystallized at room temperature from methanol/ether. 80 g. of tridehydroemetine chloride hydrochloride of melting point 176–178° C. was thus obtained. Treatment of the methanolic solution of the hydrochloride with 60% aqueous perchloric acid yielded tridehydro-emetine diperchlorate melting at 162–163° C., U.V.—maxima of the hydrochloride in alcohol at 232 (shoulder), 285 mμ and 365 mμ, ε=23,200, 18,300 and 15,800.

A solution of 4.4 g. of sodium borohydride in 25 ml. of water was added, in the course of 15 minutes, with cooling to 20–25° C., to a solution of 15 g. of tridehydroemetine-chloride hydrochloride in 150 ml. of methanol. The so-formed mixture was stirred for 2 hours, the methanol removed in vacuo, the residue extacted with chloroform, the chloroform solution concentrated to dryness and the so-obtained residue dissolved in 50 ml. of methanol and 4.9 g. of anhydrous oxalic acid added thereto. Upon standing overnight at 5° C., 7.75 g. of rac. 2-dehydroisoemetine acid oxalate melting at 176–178° crystallized out. After the removal by filtration of the crude oxalate of rac. 2-dehydro-isoemetine, the filtrate was concentrated in vacuo. The residue was then partitioned between aqueous sodium hydroxide and chloroform. The chloroform solution was concentrated and the residue consisted of 7.6 g. of crude 2-dehydroemetine base. This was dissolved in 50 ml. of 80% methanol and 8 N methanolic hydrochloric acid was added thereto in slight excess. Ether was added to the resulting solution until turbidity commenced and the dispersion then permitted to stand overnight at 5° C. As a result there was obtained 2,3-dehydroemetine dihydrochloride in the form of a hydrate melting at 245–247° C. (dec.).

The effectiveness of the compounds useful in this invention against *H. meleagridis* is illustrated in the following manner:

72 hours prior to infection the compounds are administered to the birds, turkey poults in this case, and treatment is continued for 24 days. The poults are infected by oral anministration with a pipette of about 500 embryonated eggs of *H. gallinae*. At the end of 24 days, the birds are autopsied and examined for hepatic and cecal lesions, if any, and their intensity. The degree of pathology is scored from 0 to 5. The average score of untreated infected controls being 3.5 or greater and any score 2.0 or below in the treated poults is considered an acceptable result. The test involved 10 poults each as infected controls, drug treated infected birds and uninfected untreated controls.

Treatment was conducted by placing the feed and/or water containing the drug before the birds for ingestion ad libitum. For example, 0.0125 gram of 2,3-dehydroemetine dihydrochloride is mixed with each 100 grams of poultry feed and put into the feeding area of the case of the poults. After feeding, the effectiveness of the composition is measured according to the method described. The results of the test using more than one dosage are shown in the table.

| Compound | Dosage in feed, percent | Number of birds | Mortality, Percent | Average degree of infection |
|---|---|---|---|---|
| 2,3-dehydroemetine dihydrochloride | 0.0125 | 10 | 0 | 0.0 |
| | 0.00625 | 10 | 0 | 0.4 |
| | 0.00312 | 10 | 0 | 1.2 |
| UUC [1] | None | 10 | 0 | 0.0 |
| IUC [2] | None | 10 | 80 | 4.4 |

[1] Uninfected Untreated Controls.
[2] Infected Untreated Controls.

As the data in the table indicates, the active compound is effective in dosages as low as 0.00312% in feed.

What is claimed is:

1. A method of combatting blackhead disease in birds which comprises orally administering to birds suffering from said disease an effective amount of a compound represented by the formula

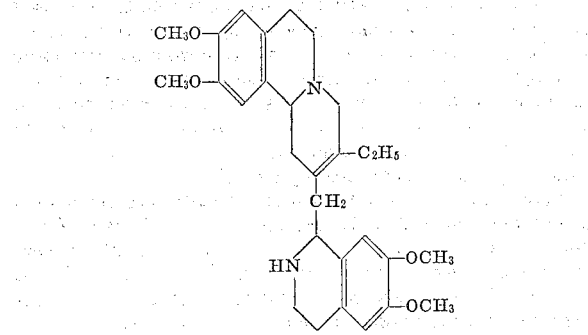

or salts thereof with pharmaceutically acceptable acids.

2. The method of claim 1 wherein the compound is administered in admixture with an ingestable inert carrier.

3. The method of claim 2 wherein said ingestable inert carrier is bird feed and the effective amount of said compound is 0.003 gram to 0.0250 gram per 100 grams of feed.

4. The method of claim 2 wherein said ingestable inert carrier is water and the effective amount of said compound is from 0.0015 to 0.0125 gram per 100 cc. of water.

References Cited

UNITED STATES PATENTS

| | | | |
|---|---|---|---|
| 2,995,490 | 8/1961 | Brubaker et al. | 167—53.1 |
| 3,240,782 | 3/1966 | Brossi et al. | 260—286 |
| 3,349,096 | 10/1967 | Rooney | 260—299 |

ALBERT T. MEYERS, Primary Examiner

JAMES V. COSTIGAN, Assistant Examiner